Patented June 13, 1933

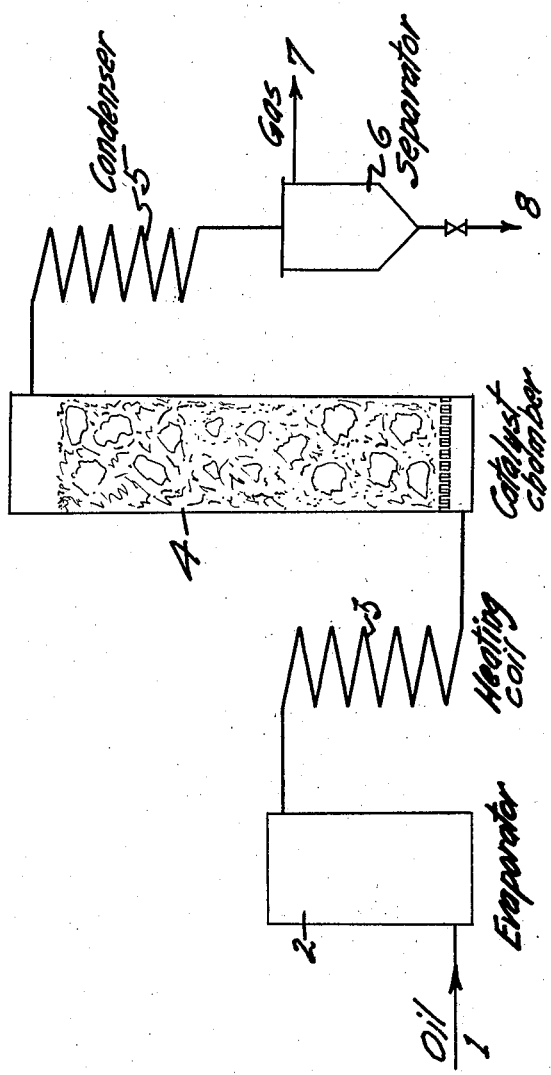

1,913,940

UNITED STATES PATENT OFFICE

ALWIN MITTASCH, OF MANNHEIM, MATHIAS PIER, OF HEIDELBERG, RUDOLF WIETZEL, OF LUDWIGSHAFEN-ON-THE-RHINE, AND HELLMUTH LANGHEINRICH, OF MERSEBURG, GERMANY, ASSIGNORS TO I. G., FARBENINDUSTRIE AKTIENGESELLSCHAFT, OF FRANKFORT-ON-THE-MAIN, GERMANY, A CORPORATION OF GERMANY

PRODUCTION OF HYDROCARBONS

Application filed February 24, 1927, Serial No. 170,737, and in Germany February 26, 1926.

The present invention relates to the production of valuable, chiefly aromatic hydrocarbons from low boiling aliphatic and hydroaromatic hydrocarbons of any origin, in particular those liquid products obtainable by the destructive hydrogenation of coals, tars, mineral oils, distillation products, extraction products and other conversion products or residues thereof and the like, and those resulting from some cracking processes. For the sake of brevity, all such hydrocarbons boiling substantially within the gasoline range are referred to as "low boiling naphthas of the nature of gasoline."

We have found that the said hydrocarbons resulting from decomposition of carbonaceous materials can be converted with good yields into aromatic and other more valuable hydrocarbons by treating them at elevated temperatures with dehydrogenating catalysts.

From the resulting products for example considerable amounts of hydrocarbons of the benzene series may be recovered in a more or less pure state by fractional distillation. Or the products may be directly employed for example as fuel for internal combustion engines. When employed for this purpose, the products exhibit the great advantage in comparison with the initial products which often require an addition of so-called "anti-knock agents" that owing to their content in aromatic hydrocarbons such additions can be dispensed with without any undesirable knocks occurring in use even when employed for motors with a high compression rate. Products resulting from some cracking processes are very much inclined to knocking in internal combustion engines and can therefore be employed in engines with a high compression rate only with an addition of an anti-knock agent or in mixture with fuels which are not inclined to knocking which are in most cases high in price. However, by passing such products over dehydrogenating catalysts, for example at temperatures between 400° and 800° C. motor fuels not inclined to knocking and containing more than 15 per cent of aromatic hydrocarbons are directly obtained.

As catalysts for example metals such as silver, copper, alloys of chromium and nickel, and aluminium, iron sponge or porous carbon, zinc sulfid, alumina, pumice stone or the like may be employed. The oxids of the metals belonging to the sixth group of the periodic system have been found to be of special efficiency. These oxids may be employed either alone or in mixture with each other or with other efficient materials, in particular with oxids of elements of the third and fourth group of the periodic system, and with or without supports. Also active charcoal alone or together with the said or other compounds is a very efficient catalyst. The oxids are preferably subjected to a preliminary treatment with hydrogen or gas mixtures containing hydrogen at an elevated temperature. It has been found that the said catalysts of high efficiency possess the great advantage of being little sensible to catalyst poisons. Therefore, a troublesome purification of the products to be treated can be dispensed with. Further, the said catalysts do not or only to a very small extent give rise to undesirable by-reactions.

In contradistinction to the oxids of zinc, aluminium, titanium, thorium and to wood charcoal, which have already been suggested for use as dehydrogenating catalysts, the aforementioned specially efficient catalysts are effective already at temperatures by about 200° to 300° C. below those required in the case of the former group of catalysts. Moreover they give an average yield which amounts to several times that obtained with the former group, without any losses occurring by decomposition of the materials to be treated to gaseous products or by polymerization to higher molecular compounds.

The said highly efficient catalysts are also very suitable for the production of aromatic hydrocarbons from other products than those mentioned above, i. e. from products of any origin consisting of or containing cyclo-paraffines or naphthenes hereinafter referred to as a cyclic non-aromatic hydrocarbons.

The compounds to be dehydrogenated may be passed over the catalyst in the vapor phase either alone or in mixture with aromatic or saturated hydrocarbons of another kind. Simultaneously with a disengagement of hydrogen a more or less far-going conversion into hydrocarbons chiefly of an aromatic nature takes place. If desired, the materials to be dehydrogenated may be passed over the catalyst while diluted with hydrogen or gas mixtures containing hydrogen, water or inert gases. It has been found that the presence of hydrogen in an amount less than employed in destructive hydrogenation, that is, an amount substantially less than 600 liters per kilogram of carbonaceous material, does not unfavorably influence the dehydrogenation, but quite on the contrary prevents the formation of high molecular compounds which would gradually diminish the efficiency of the catalyst, the yield and the quantity of material to be treated per unit of time. The process is advantageously carried out at temperatures above 400° C., for example at between 450° and 600° C. and the treatment may take place under ordinary or elevated pressure.

The present invention will be further explained with reference to the accompanying drawing diagrammatically showing an elevation, partly in section, of a plant in which the process according to the present invention may be carried out with advantage. The invention is, however, not restricted to the particular arrangement shown in this drawing.

Referring to the drawing in detail oil to be hydrogenated, for example middle oil, is supplied at 1 and passed into the evaporator 2 in which it is brought into the vapor state. The resulting vapors are then led into the heating coil 3 in which they are brought to the reaction temperature. The hot vapors are thereupon conveyed into the reaction chamber 4 filled with a dehydrogenating catalyst comprising a metal of group 6 of the periodic system in which they are converted into a valuable non-knocking hydrocarbon fuel less rich in hydrogen than the initial oil. The mixture of dehydrogenated oil vapors and hydrogen obtained is cooled in condenser 5, the condensable constituents thus being liquefied, whereupon the mixture of liquids and uncondensed gas mainly consisting of hydrogen is separated in separator 6. The improved oil may be taken off at 8 while uncondensed gas escapes at 7.

The process according to the present invention is carried out in the absence of substantial amounts of gases comprising oxygen.

The following examples will further illustrate how our invention may be carried out in practice, but the invention is not limited to these examples.

Example 1

A brown coal (lignite) tar-oil is subjected to destructive hydrogenation under pressure by a known method. The portion of the hydrogenated oil which boils at temperatures below 250° and is low in benzene homologues is passed at 550 to 600° C. over porous coal mixed with zinc oxid. A product containing about 30 per cent or oven more of benzene hydrocarbons is obtained. The hydrogen disengaged may be utilized for the destructive hydrogenation of fresh quantities of the tar oil.

Example 2

A mixture of hydrocarbons obtained by the catalytic destructive hydrogenation of crude oil under pressure is passed in the presence of water vapor at 650° over a catalyst consisting of cadmium sulfid on a support of pumice stone. Thereby hydrogen is split off and ample yields of benzene hydrocarbons are obtained along with unsaturated compounds. Instead of cadmium sulfid, zinc sulfid, zinc oxid, zinc chromate, alumina, chromium oxid also nickel, copper, palladium or similar dehydrogenating catalysts may be used. The dehydrogenation can be effected at atmospheric or elevated pressure.

Example 3

Hexahydrotoluene is passed in a current of nitrogen over a catalyst consisting of molybdic acid mixed with 10 per cent of alumina and heated to 450° C., at which temperature the molybdic acid is converted into molybdenum oxide. A very good yield of toluene besides some unchanged initial material is obtained by condensing the gas leaving the reaction vessel.

Example 4

Hydrogen mixed with 3.5 per cent of cyclohexane vapor is passed with a speed of 2 litres per hour and per cubic centimetre of the contact mass and at 450° C. over molybdic acid previously treated with hydrogen at below 600° C. The resulting product consists of nearly pure benzene and has a specific gravity of 0.878 at 15° C. and a bromine number of 0.012 grammes per cubic centimetre.

Example 5

The fraction boiling between 115 to 125° C. of a synthetic benzine obtained by the destructive hydrogenation of brown coal tar under pressure, which fraction may contain dimethylcyclohexane, is vaporized in a current of hydrogen so that the latter contains about 4 per cent, by volume, of hydrocarbons. This mixture is passed at 450° C. over a molybdic acid catalyst obtained as described in the foregoing example. The product thus obtained has a specific gravity of 0.851 at 15° C., whereas the initial material had a specific gravity of 0.779.

What we claim is:

1. A process for producing valuable chiefly aromatic hydrocarbons, which comprises dehydrogenating hydrocarbons containing cyclic non-aromatic hydrocarbons by heating them at a temperature of between about 300 and 600° C. and under substantially atmospheric pressure in the presence of a catalyst comprising molybdenum oxide and alumina but in the absence of substantial amounts of gases comprising free oxygen.

2. A process for eliminating the tendency to knock from low boiling naphthas of the nature of gasoline having a tendency to knock which comprises dehydrogenating said naphthas by subjecting them in the absence of heavier hydrocarbons to the action of a catalyst containing an oxide of a metal of the 6th group and an oxide of one of the metals of groups three and four of the periodic system at a temperature between 300° and 600° C. and under substantially atmospheric pressure, but in the absence of substantial amounts of gases comprising free oxygen.

3. A process which comprises subjecting a hydrocarbon to the action of a catalyst containing an oxide of a metal of the 6th group of the periodic system and alumina at a temperature between 300° and 600° C. and under substantially atmospheric pressure, but in the absence of substantial amounts of gases comprising free oxygen.

4. A process which comprises subjecting a hydrocarbon to the action of a catalyst containing molybdenum oxide and alumina at a temperature between 300° and 600° C. and under substantially atmospheric pressure, but in the absence of substantial amounts of gases comprising free oxygen.

5. The process of eliminating the tendency to knock from low boiling naphthas of the nature of gasoline having a tendency to knock which comprises dehydrogenating said naphthas by subjecting them in the absence of substantial amounts of heavier hydrocarbons to the action of an oxide of a metal of the sixth group of the periodic system at a temperature between about 300 and 600° C., but in the absence of substantial amounts of gases comprising free oxygen and under such conditions that insufficient hydrogen is present to effect destructive hydrogenation.

6. The process of eliminating the tendency to knock from low boiling naphthas of the nature of gasoline resulting from the decomposition of carbonaceous materials and having a tendency to knock which comprises dehydrogenating said naphthas by subjecting them in the absence of substantial amounts of heavier hydrocarbons to the action of an oxide of a metal of the sixth group of the periodic system at a temperature between about 300 and 600° C. and under substantially atmospheric pressure, but in the absence of substantial amounts of gases comprising free oxygen and under such conditions that insufficient hydrogen is present to effect destructive hydrogenation.

7. The process of eliminating the tendency to knock from low boiling naphthas of the nature of gasoline resulting from the decomposition of carbonaceous materials and having a tendency to knock which comprises dehydrogenating said naphthas by subjecting them in the vapor phase in the absence of substantial amounts of heavier hydrocarbons and in admixture with a gas containing hydrogen in insufficient amounts to effect destructive hydrogenation to the action of an oxide of a metal of the sixth group of the periodic system at a temperature between about 300 and 600° C., but in the absence of substantial amounts of gases comprising free oxygen.

8. The process of eliminating the tendency to knock from low boiling naphthas of the nature of gasoline having a tendency to knock which comprises dehydrogenating said naphthas by subjecting them in the absence of substantial amounts of heavier hydrocarbons to the action of a catalyst containing molybdenum at a temperature between about 300 and 600° C., but in the absence of substantial amounts of gases comprising free oxygen.

9. A process for producing valuable chiefly aromatic hydrocarbons which comprises dehydrogenating low boiling naphthas of the nature of gasoline containing cyclic non-aromatic hydrocarbons by heating them at a temperature of between about 300 and 600° C. in the absence of substantial amounts of heavier hydrocarbons and under substantially atmospheric pressure in the presence of a catalyst comprising an oxide of a metal of group six of the periodic system, but in the absence of substantial amounts of gases comprising free oxygen.

10. A process of producing valuable chiefly aromatic hydrocarbons which comprises dehydrogenating low boiling naphthas of the nature of gasoline containing cyclic non-aromatic hydrocarbons by heating them in the absence of substantial amounts of heavier hydrocarbons at a temperature between about 450 and 600° C. and under substantially atmospheric pressure in the presence of a catalyst comprising an oxide of a metal of group six of the periodic system, but in the absence of substantial amounts of gases comprising free oxygen.

11. A process for producing valuable chiefly aromatic hydrocarbons which comprises dehydrogenating low boiling naphthas of the nature of gasoline containing cyclic non-aromatic hydrocarbons by heating them in the absence of substantial amounts of heavier hydrocarbons at a temperature of between about 300 and 600° C. and under substantially atmospheric pressure in the presence of a catalyst comprising an oxide of a metal selected from the group consisting of chromium and molybdenum, but in the absence of substantial amounts of gases comprising free oxygen.

12. The process of eliminating the tendency to knock from low boiling naphthas of the nature of gasoline having a tendency to knock which comprises dehydrogenating said naphthas by subjecting them in the absence of substantial amounts of heavier hydrocarbons in admixture with hydrogen in insufficient amounts to effect destructive hydrogenation to heat treatment at a temperature of between about 300 and 600° C. and under substantially atmospheric pressure in the presence of a catalyst comprising an oxide of a metal of group 6 of the periodic system, but in the absence of substantial amounts of gases comprising free oxygen.

13. The process of eliminating the tendency to knock from low boiling naphthas of the nature of gasoline having a tendency to knock which consists of dehydrogenating said naphthas by heating them at a temperature of between 300 and 600° C. under superatmospheric pressure and in the presence of a catalyst comprising an oxide of a metal of group 6 of the periodic system.

14. The process of eliminating the tendency to knock from low boiling naphthas of the nature of gasoline having a tendency to knock which consists of dehydrogenating said naphthas by heating them at a temperature between about 450 and 600° C. under superatmospheric pressure and in the presence of a catalyst comprising an oxide of a metal of group six of the periodic system.

15. The process of eliminating the tendency to knock from low boiling naphthas of the nature of gasoline having a tendency to knock which consists of dehydrogenating said naphthas by subjecting them at a temperature of between about 300 and 600° C. under superatmospheric pressure and in the presence of a catalyst comprising an oxide of a metal selected from the group consisting of chromium and molybdenum.

In testimony whereof we have hereunto set our hands.

ALWIN MITTASCH.
MATHIAS PIER.
RUDOLF WIETZEL.
HELLMUTH LANGHEINRICH.